United States Patent
Duan et al.

(10) Patent No.: US 8,338,982 B2
(45) Date of Patent: Dec. 25, 2012

(54) APPARATUS TO MAINTAIN REDUNDANCY IN FOUR LINE SYSTEM

(75) Inventors: Jiwu Duan, Tucson, AZ (US); Steven M. Groff, Tucson, AZ (US); Trung Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/721,282

(22) Filed: Mar. 10, 2010

(65) Prior Publication Data

US 2011/0225452 A1    Sep. 15, 2011

(51) Int. Cl.
*H02J 3/38*    (2006.01)
(52) U.S. Cl. .............................. 307/19; 307/29; 307/113
(58) Field of Classification Search .................. 307/19, 307/113, 29, 112
See application file for complete search history.

(56) References Cited

U.S. PATENT DOCUMENTS

| | | | |
|---|---|---|---|
| 4,788,449 A | 11/1988 | Katz | |
| 4,967,096 A * | 10/1990 | Diemer et al. | 307/19 |
| 5,646,462 A * | 7/1997 | Cortes et al. | 307/127 |
| 5,881,215 A | 3/1999 | Alft | |
| 5,917,250 A * | 6/1999 | Kakalec et al. | 307/18 |
| 6,011,327 A | 1/2000 | Cook et al. | |
| 6,031,298 A | 2/2000 | Lo et al. | |
| 6,278,624 B1 | 8/2001 | Nelson | |
| 6,608,403 B2 | 8/2003 | Liu et al. | |
| 6,747,369 B2 | 6/2004 | Griffith et al. | |
| 7,464,292 B2 | 12/2008 | Zansky et al. | |
| 2004/0070278 A1 | 4/2004 | Divan et al. | |
| 2008/0150363 A1 | 6/2008 | Kuo | |
| 2009/0271642 A1 | 10/2009 | Cheng et al. | |

FOREIGN PATENT DOCUMENTS

| | | | |
|---|---|---|---|
| JP | 05146098 A | * | 6/1993 |
| JP | 20070189861 | | 7/2006 |

OTHER PUBLICATIONS

International Search Report for counterpart PCT Application No. PCT/EP2011/051910, mailed Jun. 22, 2011.
Steven Groff, Specification IBM PN 45W1961, 3-φ wye Automatic Transfer Switch, Rated 12KVA, IAC-30A-EU IBM PN 45W1816, Aug. 28, 2009, 55 pages.
Milan M. Jovanovic, "Dual AC-Input Power System Architectures," IEEE 0-7803-7405-3/02, 2002, 6 pages.

* cited by examiner

*Primary Examiner* — Daniel Cavallari
(74) *Attorney, Agent, or Firm* — Griffiths & Seaton PLLC

(57) ABSTRACT

Exemplary embodiments adapted to distribute power from four input lines to a plurality of power supply units (PSUs) configured in an N+1 architecture are provided. In one such embodiment, a plurality of rectifier devices have first and second ends, each of the plurality of rectifier devices connected at the first end to one of the four input lines, and adapted to be bypassed by a first relay in a first operating mode and provide rectified input current in a second operating mode. A plurality of second relays is connected between each of the second ends of the plurality of rectifier devices. The plurality of second relays are adapted to be closed in the second operating mode to sum the rectified input current from each of the plurality of rectifier devices in a single node connecting each of the plurality of PSUs.

22 Claims, 7 Drawing Sheets

APPARATUS TO MAINTAIN REDUNDANCY IN FOUR LINE SYSTEM

BACKGROUND OF THE INVENTION

1. Field of the Invention

The present invention relates in general to power supplies for electronic devices, and more particularly, but not exclusively, to an apparatus to maintain redundancy in a four line cord system for use in computing environments.

2. Description of the Related Art

An N+1 redundant power system includes a number (N+1) of independent power units (such as power supplies) connected to the electrical devices, such that if one power unit fails, the system continues to function normally with the remaining N units. The power units may be power supplies, uninterruptible power supply units (UPS) or other forms of battery backup. When N=2, for example, an N+1 redundant power system has three power units. This type of power architecture provides redundancy with minimal cost and size.

High availability computer systems are expected to be powered by two independent sources, or feeds. The most common method to provide two line cord redundancy to an N+1 redundant power system is to use a transfer switch. The transfer switch connects either the first feed or the second feed, but not both, to the electrical loads.

As will be further described, where an even number of input feeds is propagated to a number of power units, a loss of a single feed will result in a loss of redundancy. In other words, where N+1 power units were originally configured, the loss of the single feed results in only N power units remaining in operation. In some cases this is due to the total power demand of the N+1 power units exceeding the supply power of the remaining feed, again as will be further illustrated.

SUMMARY OF THE INVENTION

In view of the foregoing, a need exists for a mechanism connecting dual feeds (thereby having an even number of input line cords) to an odd number of electrical loads, while maintaining redundancy characteristics in the event of a loss of one of the input line cords. Accordingly, various embodiments adapted to distribute power from four input lines to a plurality of power supply units (PSUs) configured in an N+1 architecture are provided.

In one such embodiment, by way of example only, a plurality of rectifier devices have first and second ends, each of the plurality of rectifier devices connected at the first end to one of the four input lines, and adapted to be bypassed by a first relay in a first operating mode and provide rectified input current in a second operating mode. A plurality of second relays is connected between each of the second ends of the plurality of rectifier devices. The plurality of second relays are adapted to be closed in the second operating mode to sum the rectified input current from each of the plurality of rectifier devices in a single node connecting each of the plurality of PSUs.

Additional apparatus and method of manufacture embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
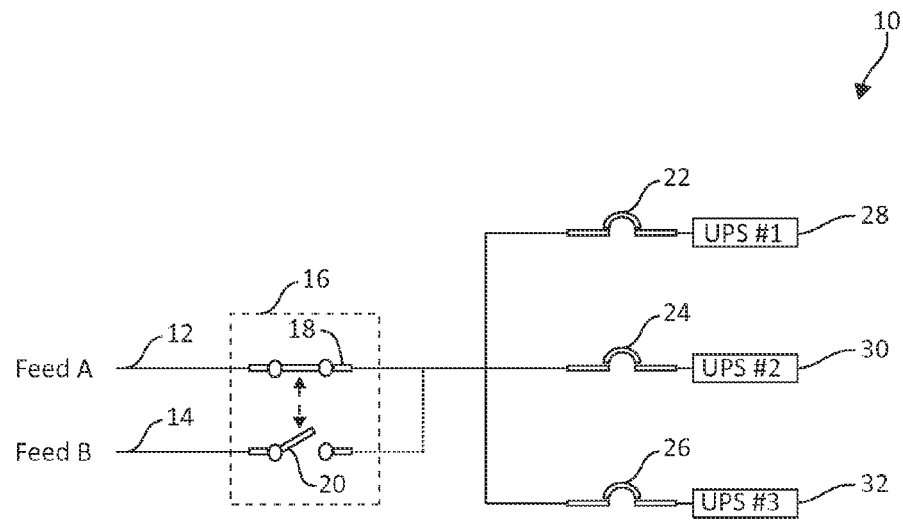
FIG. 1 is block/schematic diagram of a conventional single power transfer switch.

High availability computer systems are expected to be powered by two independent sources of electric power or feeds. When any one electrical power source is lost, the system should still maintain full redundancy, i.e., power will be delivered to all the N+1 power units. When N+1 is odd, an automatic transfer switch is used. The basic form of this concept is shown in FIG. 1, following, which illustrates a block/schematic diagram 10 of a conventional single power transfer switch 16. Power transfer switch 16 allows either of two input feeds 12 and 14 (A or B) to be connected to power units 28, 30, and 32 through branch circuit protection devices 22, 24, and 26 respectively.

Power transfer switch 16 as shown uses two relays 18 and 20, which alternatively open and close to provide power from either of the two input feeds 12 and 14. Relays 18 and 20 are typically interlocked to prevent both feeds 12 and 14 from being connected to the power units 28, 30, and 32 at the same time.

In order for power units 28, 30, and 32 to be fully functional in the event of a loss of line power from either input feed 12 and 14, both of the input feeds 12 and 14 must be rated to supply the fully system power. In one example, in the U.S., rack mount storage devices are typically connected to 60 A feeds. In a power system including three (N+1) equal loads, each load can not require more than 20 A per load.

Figure 2:
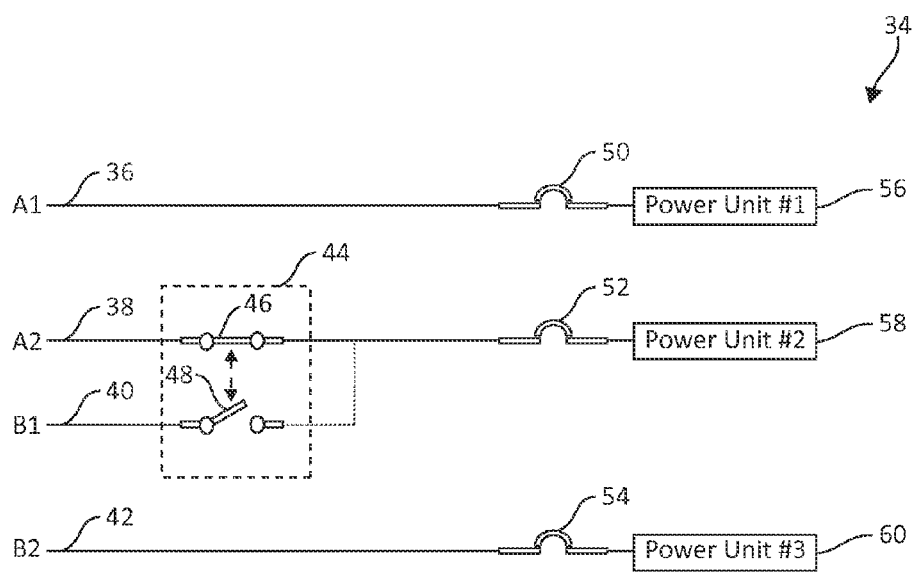
FIG. 2 is a block/schematic diagram of an additional conventional single power transfer switch.

In some implementations, however, only 30 A services may be available. In these cases, a four input line solution is offered. Turning to FIG. 2, following, an exemplary block/schematic diagram 34 of a conventional power transfer switch 44 in a four input line feed implementation is depicted. Input feeds A (A1 and A2) and B (B1 and B2), depicted as lines 36, 38, 40, and 42, respectively, supply redundant power through branch circuit protection devices 50, 52, and 54 to power units 56, 58, and 60.

Power transfer switch 44 includes two relays 46 and 48 connected to input lines 38 and 40 as shown. Here again, the two relays 46 and 48 typically are interlocked to prevent simultaneous connection of both input lines 38 and 40 to power unit 58, and either relay 46 or relay 48 is operable at any one time to supply the input power to the power unit 58.

Figure 3:
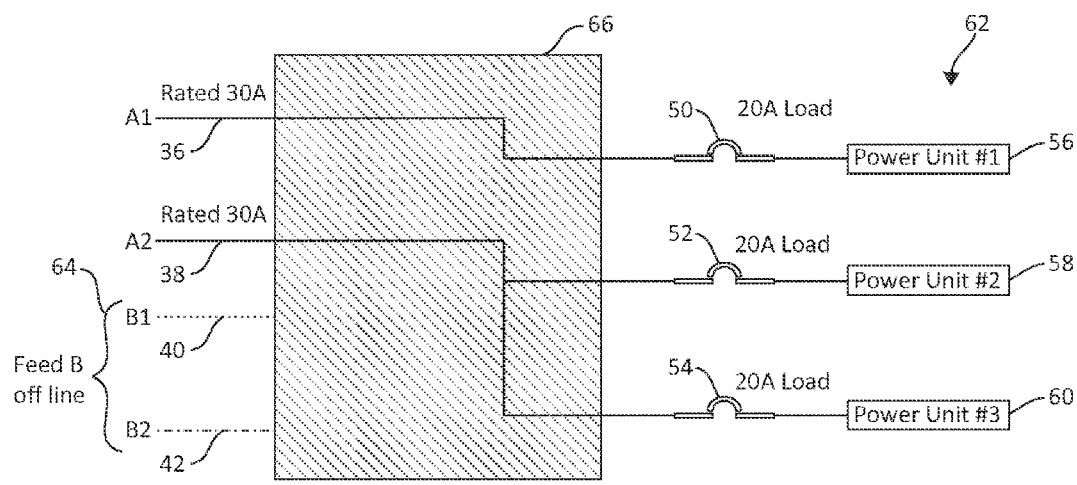
FIG. 3 is a block/schematic diagram of four conventional exemplary input line cords with one feed offline.
Figure 4:
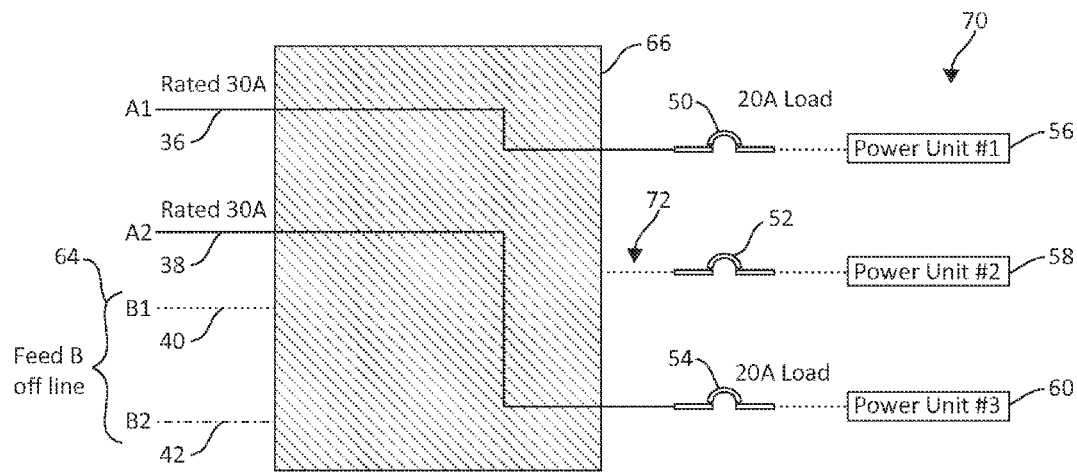
FIG. 4 is a block/schematic diagram of a further depiction of the illustration first depicted in FIG. 3, showing a loss of N+1 redundancy.

Turning now to FIGS. 3 and 4, following, a block/schematic diagram 62 is depicted of four conventional exemplary input line cords with one feed offline (FIG. 3), and a block/schematic diagram 70 of a further depiction of four input lines is illustrated, showing a loss of N+1 redundancy. FIGS. 3 and 4 include the exemplary components previously depicted in FIG. 2, such as input lines 36, 38, 40, and 42, branch circuit protection 50, 52, and 54, and power units 56, 58, and 60.

As can be seen from FIG. 3 and FIG. 4, using a four input line solution, a loss of a single feed (either A1 and A2 or B1 and B2) will result in a loss of redundancy with only N power units running. Referring first to FIG. 3, each power unit 56, 58, and 60 is rated at 20 A. If each input line 40 and 42 of feed B is taken offline, power units 58 and 60 must share the power supplied by input line 38. As is further illustrated in FIG. 4, this situation results in an undersupply of power to the power units 58 and 60, and as demonstrated by arrow 72, power unit 58 must be correspondingly taken offline.

Figure 5:
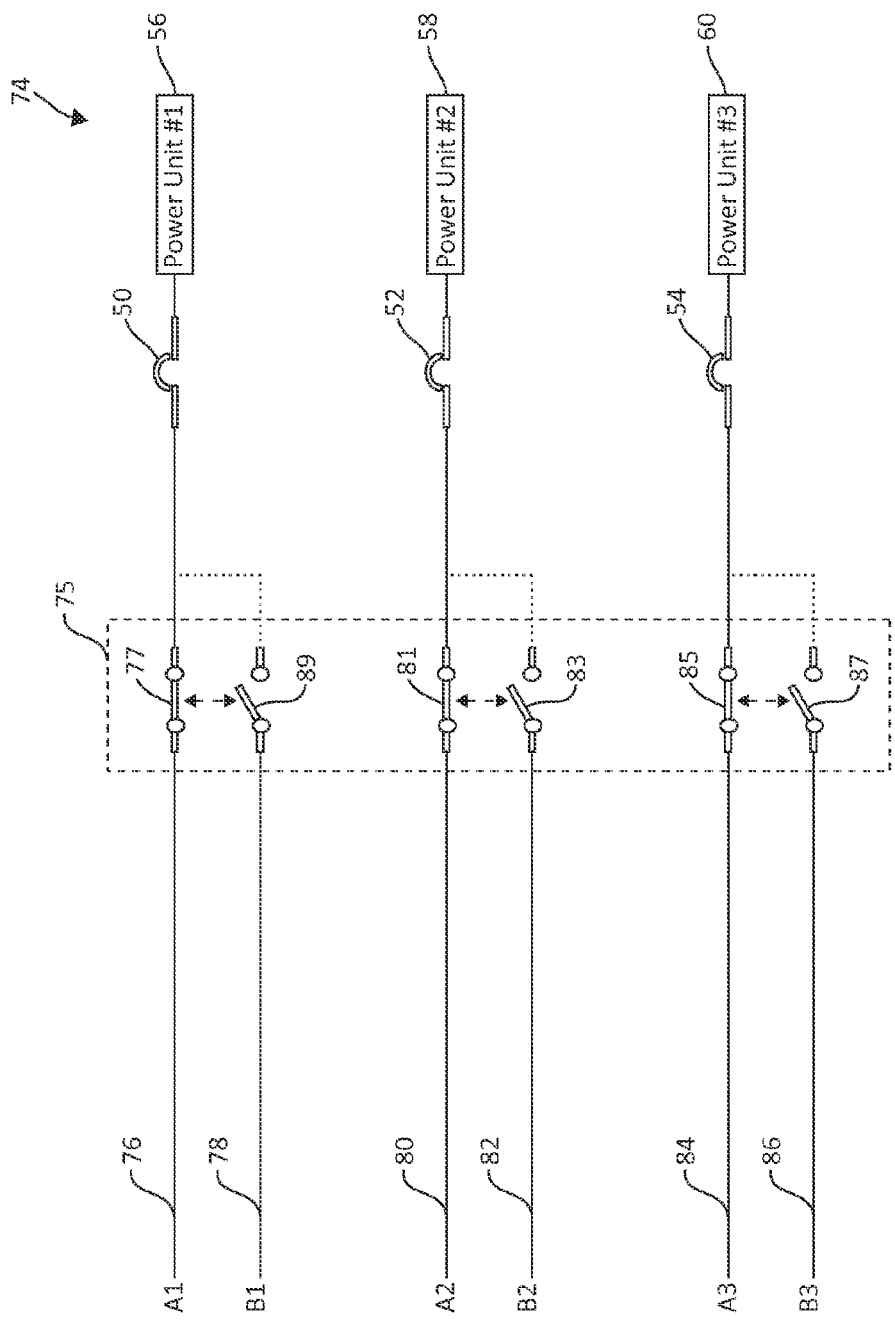
FIG. 5 is a block/schematic diagram of a conventional six line cord implementation to maintain N+1 redundancy.

Referring next to FIG. 5, a trivial solution 74 to this problem is illustrated by use of six input line cords 76, 78, 80, 82, 84, and 86 as shown, where each redundant feed (A and B) is alternatively connected using relays 76 through branch circuit protection devices 50, 52, and 54 to power units 56, 58, and 60. Relays 76 include switches 78 and 80, 82, and 84, and 86 and 88 respectively to accomplish providing redundant power to the power units 56, 58, and 60 should one of the feeds (again, A or B) happen to be taken offline. The depicted implementation provides a solution to the aforementioned problem, however a large number of input line cords may be undesirable to a user, and a four line input cord solution is more desirable.

Maintenance of redundancy in a four input line implementation (where only two input line cords remain after a loss of an input feed) presents challenges. One line cord has more than enough power for one load, but not enough for 2 loads (only 30 A is available from one line cord when 40 A is needed for two power units, for example). The known solution shown in FIG. 4, previously, simply disconnects one power unit when a feed is loss.

Figure 6:
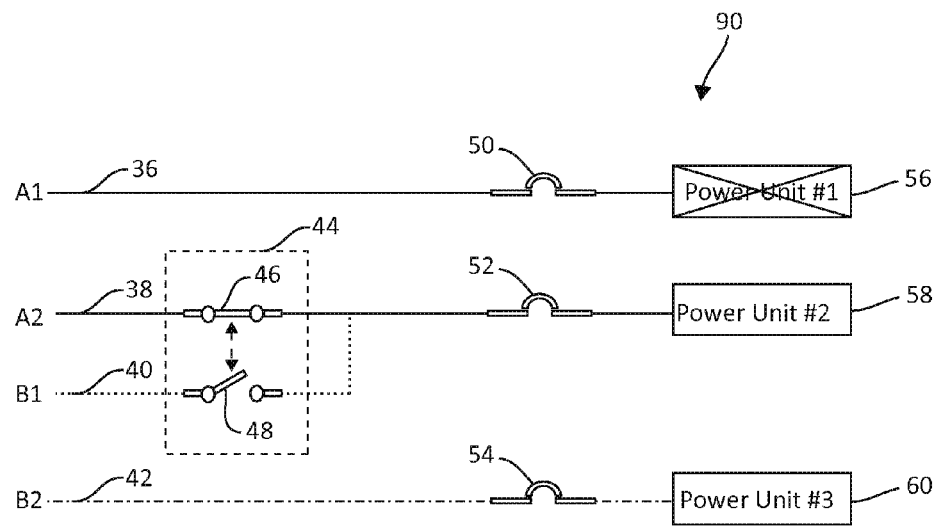
FIG. 6 is a block/schematic diagram of an exemplary power unit failure creating a loss of N+1 redundancy.

Referring now to FIG. 6, the configuration previously depicted in FIG. 2 is again shown to demonstrate a scenario 90 where a failure of a power unit (e.g., power unit 56) and not a loss of input power will also cause a loss of redundancy. Here again, input lines 36, and 38 are shown corresponding to feed A (A1 and A2), and input lines 40 and 42 are shown corresponding to feed B (B1 and B2).

Power unit 56 is shown connected through branch circuit protection 50 to input line 36, while power unit 58 is connected to power transfer switch 44 (including relays 46 and 48 as previously described). Power transfer switch 44 is operable to connect one of the two input lines 38 and 40 through the branch circuit protection 52 to the power unit 58. Finally, power unit 60 is directly connected to the input line 42 through branch circuit protection 54 to the input line 42.

Under normal operating conditions, solutions such as those depicted in FIGS. 2 and 6 will provide proper power distribution. In the event that one feed (again A1 and A2 or B1 and B2 in the depicted embodiment) is lost, the power system redundancy is also lost. In this state, the N+1 redundancy is lost, and a single power unit failure will bring down the system, as is shown in the depicted embodiment where feed B1 and B2 is lost (thereby causing the loss of power unit 60), and power unit 56 is offline.

To address the need for a mechanism connecting dual feeds (thereby having an even number of input line cords) to an odd number of electrical loads, while maintaining redundancy characteristics in the event of a loss of one of the input line cords, the following illustrated embodiments describe power transfer devices (such as an automatic transfer switch, or ATS device) that combines AC power in the event of a loss of a single feed and powers the electrical components (such as the aforementioned rack mount storage devices) at full redundancy. Pursuant to this mechanism, the two remaining AC sources (such as the previously described 30 A sources) are combined into a single source (i.e., 60 A using the present example) to feed the power units (such as three, 20 A power units).

The following illustrated embodiments provide a mechanism for distributing power from each input line cord (such as an embodiment having four input line cords) to all the power units while maintaining redundancy, even when one electrical service is lost. Pursuant to this mechanism, the remaining AC input power lines are rectified, summed into a common node, and redistributed to all the output loads as will be further described. In this manner, the total power from all remaining input line cords is distributed to all output loads. Using the previous example, two 30 A rated line cords may supply the 60 A required to feed three power units requiring 20 A apiece. This functionality is not achievable in the previous known solutions such as that depicted in FIG. 2. In that embodiment, for example, the AC currents cannot be directly combined.

Figure 7:
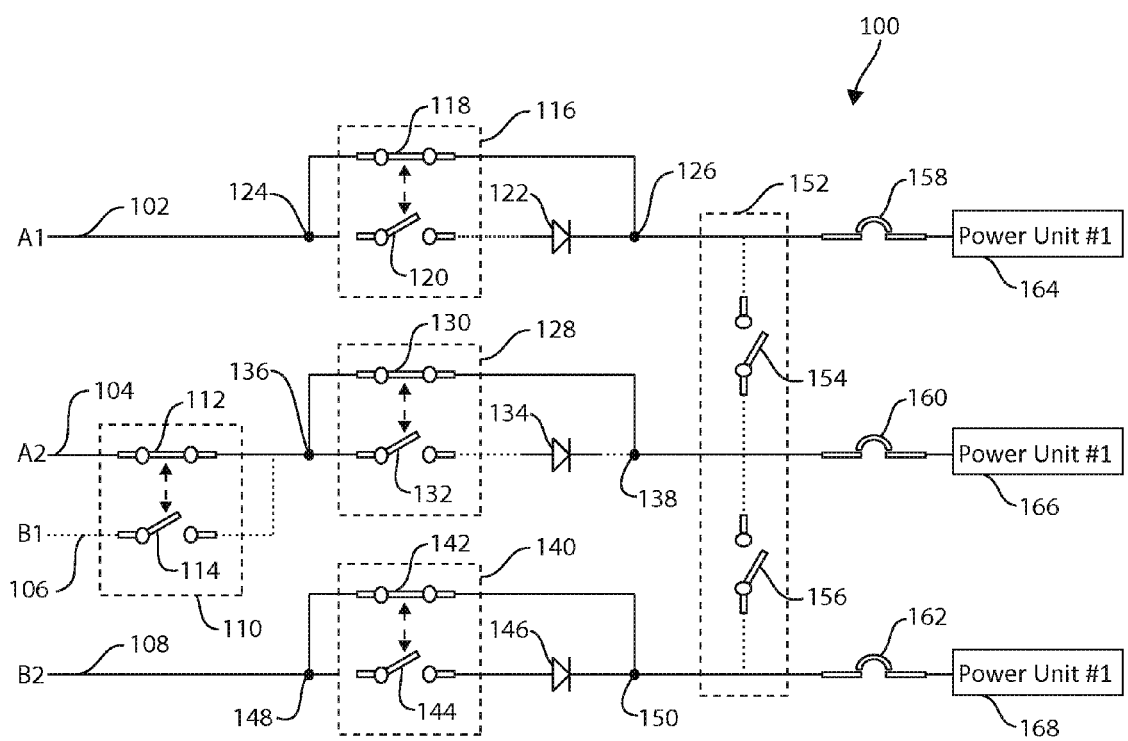
FIG. 7 is a block/schematic diagram of an exemplary apparatus to distribute power between an even number of input line cords to an N+1 redundant power system, illustrating a first mode of operation.

Turning now to FIG. 7, an exemplary power transfer mechanism 100 is depicted according to one embodiment of the present invention, allowing for distribution of power from four input line cords to an N+1 redundant power system, where N is even. A configuration of transfer switches and rectifiers connects either three out of four line cords or two out of four line cords, to the N+1 electrical loads. The case where N=2 and all input line cords are energized is presently shown. In the default AC operating mode, the rectifiers are bypassed by the relays. The highest efficiency is provided in this mode, again as shown.

Feed A (A1 and A2) is represented by input lines 102 and 104. Feed B (B1 and B2) is represented by input lines 106 and 108. Relays 116, 128, and 140 are operable as shown to provide the input power from input lines 102, 104, 106, and 108 through nodes 124, 136, and 148, respectively, to either bypass rectifier devices 122, 134, and 146, or provide power to the same rectifier devices 122, 134, and 146, which in either case then is seen at nodes 126, 138, and 150, respectively.

As is further shown, the relays 116, 128, and 140 further include two switches connected in parallel, such as switches 118 and 120, 130 and 132, and 142 and 144. One of ordinary skill in the art will appreciate that the relays 116, 128, and 140, and switches 118-144 may include a variety of switches, relays, contactors, controlled switches, and other switch devices. Similarly, rectifier devices 122, 134, and 146 may include diodes and similar rectifier devices. In the depicted embodiment, relays 116, 128, and 140 are operable in the default AC operating mode, where the rectifier devices 122, 134, and 146 are bypassed by closed switches 118, 130, and 142.

Relays 152 are shown including switches 154 and 156 connected in series between each of the nodes 126, 138, and 150. In this way, relays 152 (switches 154 and 156) are operable when closed to become a shared or common node between the branch circuit protection devices 158, 160, and 162, and power units 164, 166, and 168.

Branch circuit protection devices 158, 160, and 162 may, as one skilled in the art will anticipate, vary for a particular implementation. For example, branch circuit protection devices 158, 160, and 162 may include fuses, fuse elements, fusible links, circuit breakers, and the like as one of ordinary skill in the art will expect.

A further relay 110 is shown having two switches 112 and 114 connected in parallel. Switch 112 is operable when closed to provide power from line input 104 to the node 136 and ultimately to the power unit 166. Similarly, switch 114 is operable when closed to provide power from the line input 106 to the node 136 and ultimately to the power unit 166. In each case, switches 112 and 114, 118 and 120, 130 and 132, and 142 and 144 alternatively actuate such that either, but not both, of the respective lines connecting the switches in parallel are active at any one time.

A controller 101 is coupled to the relays 110, 116, 128, and 140, and thereby, to each of the switch structures 112 and 114, 118 and 120, 130 and 132, 142 and 144, and 154 and 156. The controller 101 may be adapted as one skilled in art would anticipate, to monitor input line voltage and/or current levels (e.g., to monitor line quality) on input lines 102, 104, 106, and 108, for example, and actuate the relays and switch structures to provide the most efficient power transfer to PSUs 164, 166, and 168. Controller 101 may provide a control signal to the switch structures described above upon a detection of a power disruption from one or more of the input lines 102, 104, 106, and 108, and/or a failure of one of the PSUs 164, 166, and 168. As one of ordinary skill in the art will expect, the relays and switch devices previously described may include electronically controllable devices, such as transistor (e.g., metal oxide semiconductor field effect transistor (MOSFET)) devices.

Figure 8:
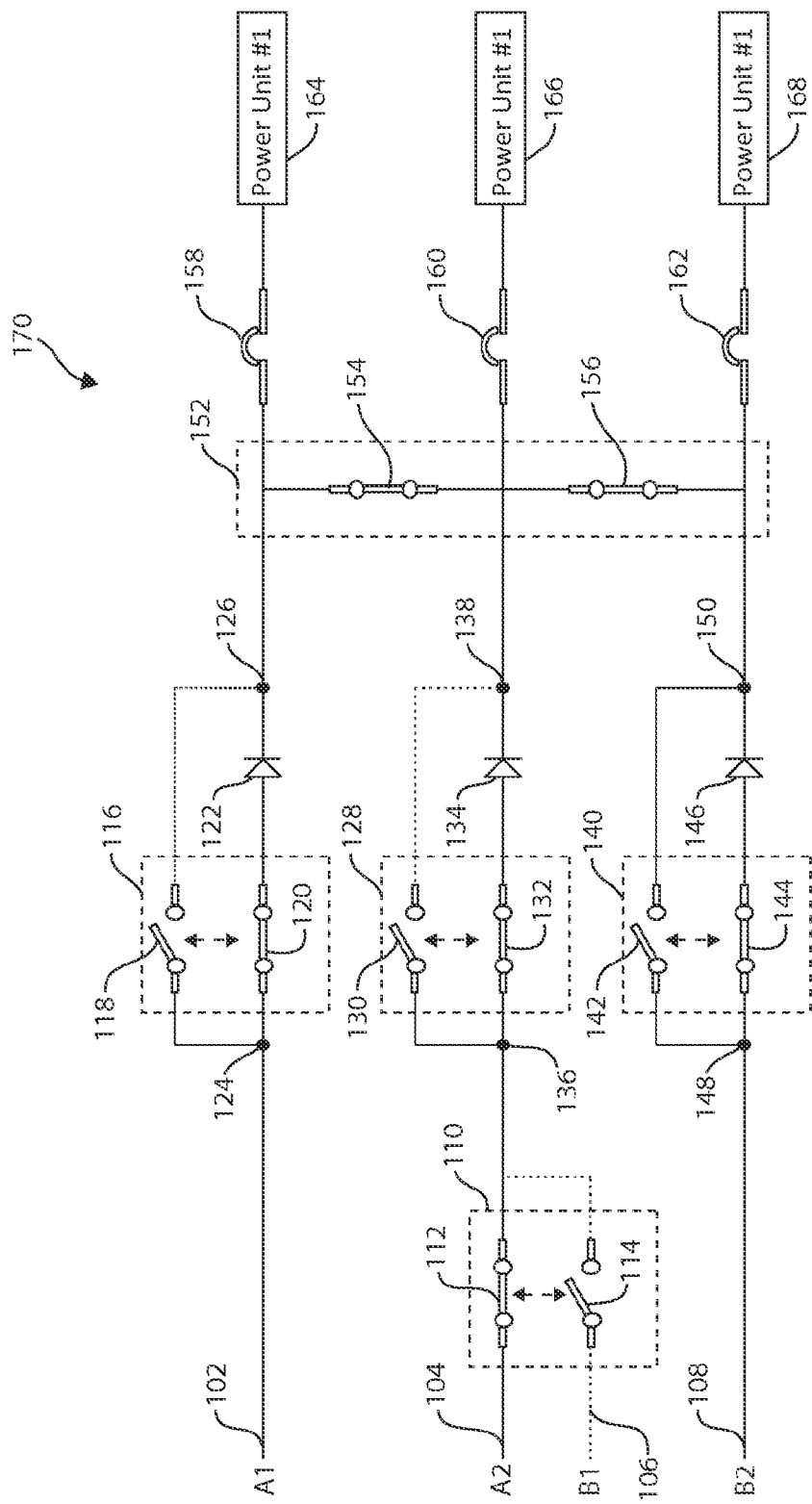
FIG. 8 is a block/schematic diagram of the exemplary apparatus first shown in FIG. 7, illustrating a second mode of operation.

Turning now to FIG. 8, the exemplary power transfer mechanism first depicted in FIG. 7 is now shown in configuration 170, where a second mode of operation (rectified AC operating mode) is now enabled. In the rectified AC operating mode, the rectifiers 122, 134, and 146 are switched into the circuit by the relays 116, 128, and 140. Relays 152 (i.e., switches 154 and 156) are also closed to form a node connecting the rectified input current (i.e., a shared node) as shown. When the controller 101 detects the loss of a feed, for example, the relays 116, 128, and 140 are transferred from the AC mode to the rectified mode as illustrated. Further, if one of the line cords 104 or 106 is determined to be offline by the controller 101, then the relay 110 (i.e., switches 112 and 114) will switch. In this case, however, the second, rectified AC mode is not required.

When operating on a single feed, the total system power will be shared between the remaining two line cords. As a result, considering the depicted embodiment, if feed B (input lines 106 and 108) are taken offline, the total system power is shared between the remaining line cords 102 and 104 of feed A. Each line cord should supply ½ of the system power. All power units will receive power and redundancy is maintained. From the example above, if each line cord is rated at 30 A, then two line cords can supply the required 60 A to feed three 20 A loads. In practice, the sum of 3 loads are expected to be significantly less than 60 A, while the sum of 2 loads will still be significantly greater than 30 A.

It should be noted as a practical implementation, a restriction is placed on the nature of the lines from a same feed, namely that they be in phase and not differing greatly in amplitude. In practice, the in-phase requirement is not difficult to satisfy when power is obtained from the same distribution panel. If the panel contains 3 phases, caution is required in selecting a common phase for a given rack. In one embodiment, in view of practical and safety considerations, a limit mode may be implemented to return a configuration to an N-mode of operation if a single line cord exceeds its current rating (e.g., 30 A) for any reason.

Figure 9:
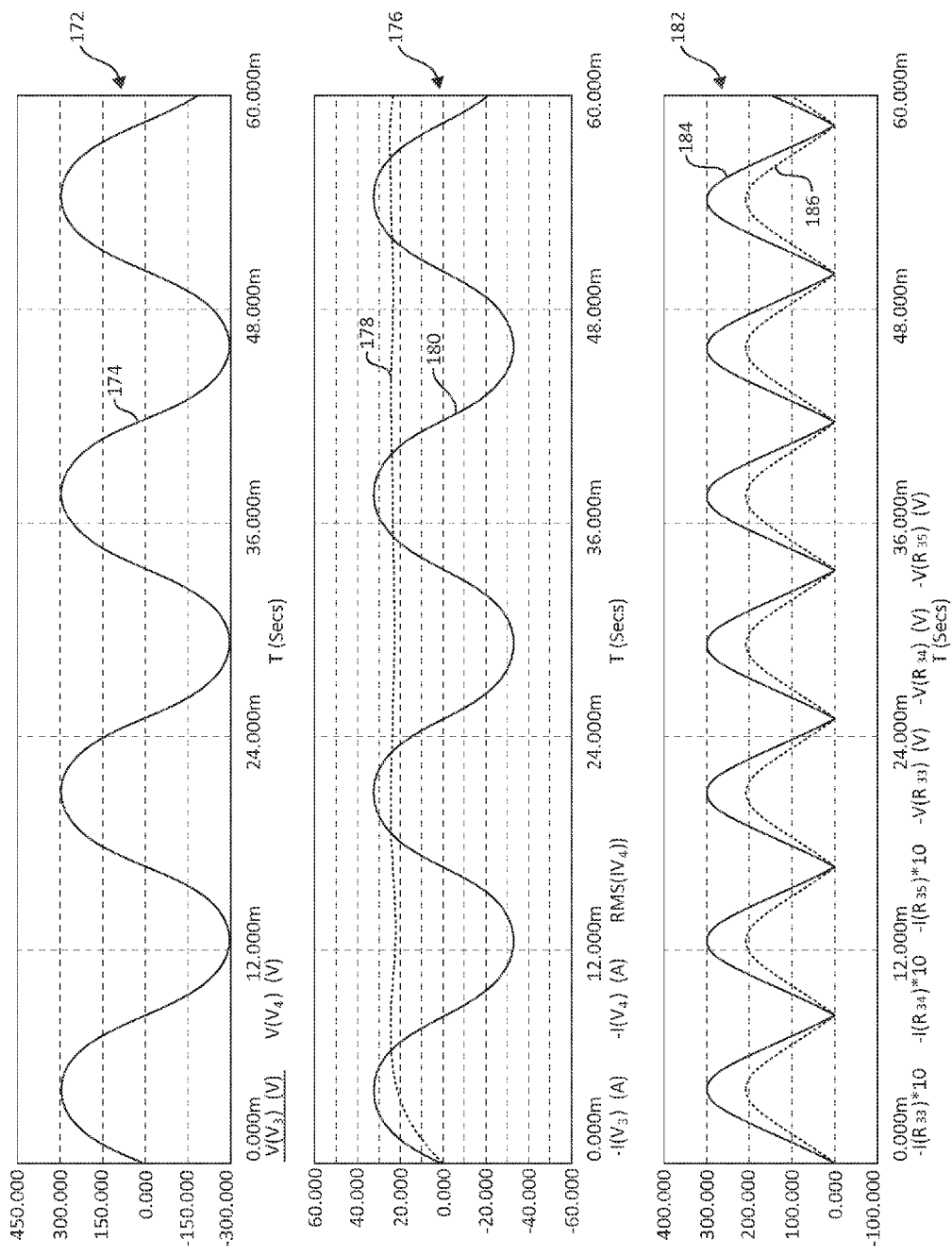
FIG. 9 is a graph diagram of an exemplary circuit simulation of a configuration depicted in FIG. 8, where two line cords power three loads while maintaining N+1 redundancy.

Turning now to FIG. 9, a graph diagram of an exemplary circuit simulation of a configuration depicted in FIG. 8 is illustrated, where feed B (input lines 106 and 108) are taken offline, and the remaining line cords 102 and 104 of feed A are used to power the three power units 164, 166, and 168. Plot 172 shows two input voltages 174 (essentially lying on top of one another), where both are approximately in phase and are of approximately the same magnitude. Plot 176 shows two input currents 180 (again, both lying on top of one another). The root mean squared (RMS) current 178 of both input currents 180 is approximately equal, and about 23 A as shown. Plot 182 shows three output voltages 184 (again of approximately equal phase and magnitude) and three output currents 186 (here again of approximately equal phase and magnitude).

Figure 10:
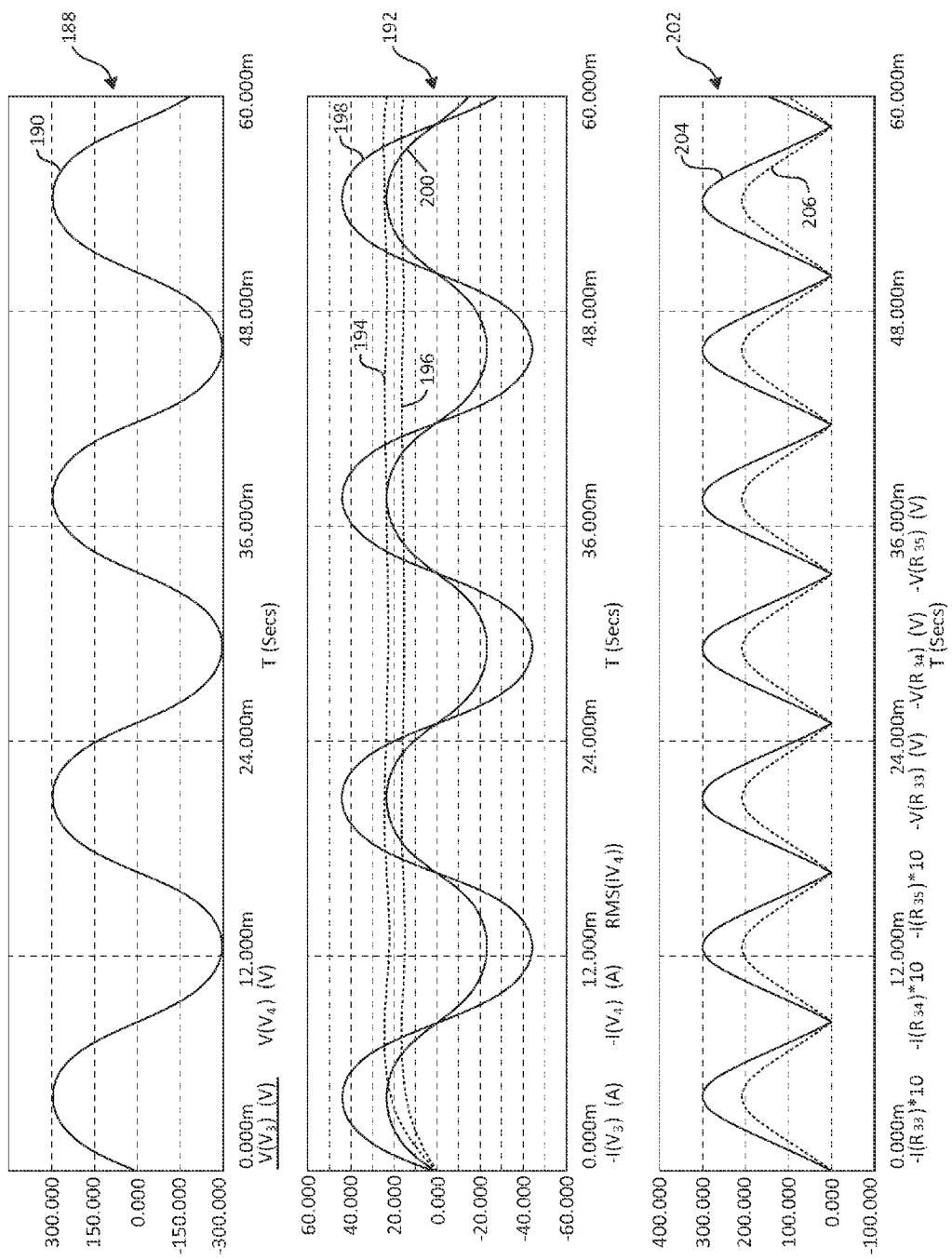
FIG. 10 is an additional graph diagram of the exemplary circuit simulation of two line cords powering three loads, while maintaining N+1 redundancy, depicting variations in input voltage.

FIG. 10, following is an additional graph diagram of the exemplary circuit simulation of two line cords powering three loads, while maintaining N+1 redundancy, depicting variations in input voltage. Plot 188 again illustrates two input voltages 190, showing both to be of approximately equal phase as previously depicted in FIG. 9. The two input voltages 190 differ in magnitude by approximately 2.5V.

Plot 192 illustrates two input currents 198 and 200, and corresponding RMS currents 196 and 194 having magnitudes of approximately 16 A and 30 A, respectively. The large imbalance in input current is caused by differences in peak voltage. The 2.5V difference in input voltage may be caused by factors such as distribution line lengths. As a result, one of ordinary skill will appreciate that such factors should be taken into consideration during any implementation to reduce such variations as much as practical.

While one or more embodiments of the present invention have been illustrated in detail, the skilled artisan will appreciate that modifications and adaptations to those embodiments may be made without departing from the scope of the present invention as set forth in the following claims.

What is claimed is:

1. An apparatus adapted to distribute power from four input lines to a plurality of power supply units (PSUs) configured in an N+1 architecture, comprising:
   a plurality of rectifier devices having first and second ends, each of the plurality of rectifier devices connected at the first end to one of the four input lines, and adapted to be bypassed by a first relay in a first operating mode and provide rectified input current in a second operating mode; and
   a plurality of second relays connected between each of the second ends of the plurality of rectifier devices, wherein the plurality of second relays are adapted to be closed in the second operating mode to sum the rectified input current from each of the plurality of rectifier devices in a single node connecting each of the plurality of PSUs.

2. The apparatus of claim 1, further including a relay device connected between two input lines of the four input lines and the first end of one of the plurality of rectifier devices, wherein the relay device is adapted to alternatively connect one of the two input lines to the one of the plurality of rectifier devices.

3. The apparatus of claim 2, further including a controller connected to the relay device, wherein the controller is adapted to detect a failure of one of the two input lines, and actuate the relay device to connect a non-failing one of the two input lines to the one of the plurality of rectifier devices.

4. The apparatus of claim 1, wherein each of the plurality of rectifier devices further includes:
 a first switch connected to a diode for supplying the rectified input current in the second operating mode when the first switch is closed, and
 a second switch connected in parallel with the first switch, and adapted to bypass the diode in the first operating mode when the second switch is closed.

5. The apparatus of claim 1, wherein the plurality of rectifier devices include three rectifier devices connected at each of the second ends to each of the plurality of PSUs, and the plurality of second relays include third and fourth switches connecting each of the plurality of PSUs in a single node when the third and fourth switches are closed.

6. The apparatus of claim 1, further including a controller connected to each of the plurality of rectifier devices and each of the plurality of second relays, wherein the controller is adapted to monitor a line quality of the four input lines, and actuate the plurality of rectifier devices and the plurality of second relays between the first and second operating mode according to the line quality.

7. The apparatus of claim 1, further including a branch circuit protection device connected between at least one of the plurality of PSUs and one of the plurality of rectifier devices to provide branch circuit protection.

8. A power distribution switch connecting four input lines to at least three power supply units (PSUs) configured in an N+1 architecture, comprising:
 a plurality of diodes;
 a plurality of first and second switches connected in parallel, each of the second switches connected to one of the plurality of diodes, wherein the plurality of first and second switches is adapted to bypass each of the plurality of diodes in a first operating mode when each of the plurality of first switches is closed, and provide rectified power in a second operating mode when each of the plurality of second switches is closed; and
 a plurality of third switches connected to each of the plurality of diodes, wherein the plurality of third switches, when closed pursuant to the second operating mode, is adapted to sum the rectified power from each of the plurality of second switches in a common node shared between each of the at least three PSUs.

9. The power distribution switch of claim 8, further including fourth and fifth switches connected between two input lines of the four input lines and one of the plurality of first and second switches, wherein the fourth and fifth switches are adapted to alternatively connect one of the two input lines to the one of the plurality of first and second switches.

10. The power distribution switch of claim 9, further including a controller connected to the fourth and fifth switches, wherein the controller is adapted to detect a failure of one of the two input lines, and actuate the fourth and fifth switches to connect a non-failing one of the two input lines to the one of the plurality of first and second switches.

11. The power distribution switch of claim 8, further including a controller connected to each of the plurality of first and second switches and each of the plurality of third switches, wherein the controller is adapted to monitor a line quality of the four input lines, and actuate the plurality of first and second switches and the plurality of third switches between the first and second operating mode according to the line quality.

12. The power distribution switch of claim 8, further including a branch circuit protection device connected between the at least three PSUs and each of the plurality of first and second switches to provide branch circuit protection.

13. A method of manufacturing an apparatus adapted to distribute power from four input lines to a plurality of power supply units (PSUs) configured in an N+1 architecture, comprising:
 providing a plurality of rectifier devices having first and second ends, each of the plurality of rectifier devices connected at the first end to one of the four input lines, and adapted to be bypassed by a first relay in a first operating mode and provide rectified input current in a second operating mode; and
 providing a plurality of second relays connected between each of the second ends of the plurality of rectifier devices, wherein the plurality of second relays are adapted to be closed in the second operating mode to sum the rectified input current from each of the plurality of rectifier devices in a single node connecting each of the plurality of PSUs.

14. The method of manufacture of claim 13, further including providing a relay device connected between two input lines of the four input lines and the first end of one of the plurality of rectifier devices, wherein the relay device is adapted to alternatively connect one of the two input lines to the one of the plurality of rectifier devices.

15. The method of manufacture of claim 14, further including providing a controller connected to the relay device, wherein the controller is adapted to detect a failure of one of the two input lines, and actuate the relay device to connect a non-failing one of the two input lines to the one of the plurality of rectifier devices.

16. The method of manufacture of claim 13, wherein providing the plurality of rectifier devices further includes, for each of the plurality of rectifier devices:
 providing a first switch connected to a diode for supplying the rectified input current in the second operating mode when the first switch is closed, and
 providing a second switch connected in parallel with the first switch, and adapted to bypass the diode in the first operating mode when the second switch is closed.

17. The method of manufacture of claim 13, wherein providing the plurality of rectifier devices includes providing three rectifier devices connected at each of the second ends to each of the plurality of PSUs, and providing the plurality of second relays includes providing third and fourth switches connecting each of the plurality of PSUs in a single node when the third and fourth switches are closed.

18. The method of manufacture of claim 13, further including providing a controller connected to each of the plurality of rectifier devices and each of the plurality of second relays, wherein the controller is adapted to monitor a line quality of the four input lines, and actuate the plurality of rectifier devices and the plurality of second relays between the first and second operating mode according to the line quality.

19. A method of manufacturing a power distribution switch connecting four input lines to at least three power supply units (PSUs) configured in an N+1 architecture, comprising:
 providing a plurality of diodes;
 providing a plurality of first and second switches connected in parallel, each of the second switches connected to one of the plurality of diodes, wherein the plurality of first and second switches is adapted to bypass each of the plurality of diodes in a first operating mode when each of the plurality of first switches is closed, and provide rectified power in a second operating mode when each of the plurality of second switches is closed; and providing a plurality of third switches connected to each of the plurality of diodes, wherein the plurality of third switches, when closed pursuant to the second operating mode, is adapted to sum the rectified power from each of the plurality of second switches in a common node shared between each of the at least three PSUs.

20. The method of manufacture of claim 19, further including providing fourth and fifth switches connected between two input lines of the four input lines and one of the plurality of first and second switches, wherein the fourth and fifth switches are adapted to alternatively connect one of the two input lines to the one of the plurality of first and second switches.

21. The method of manufacture of claim 19, further including providing a controller connected to the fourth and fifth switches, wherein the controller is adapted to detect a failure of one of the two input lines, and actuate the fourth and fifth switches to connect a non-failing one of the two input lines to the one of the plurality of first and second switches.

22. The method of manufacture of claim 19, further including providing a controller connected to each of the plurality of first and second switches and each of the plurality of third switches, wherein the controller is adapted to monitor a line quality of the four input lines, and actuate the plurality of first and second switches and the plurality of third switches between the first and second operating mode according to the line quality.

* * * * *